United States Patent Office 3,393,221
Patented July 16, 1968

3,393,221
SULPHO - CONTAINING PHENOXYPOLYALKOXY NITRILES AND THEIR FORMALDEHYDE REACTION PRODUCTS
Günther Boehmke, Cologne-Flittard, Udo Winfried Hendricks, Cologne-Stammheim, and Mathieu Quaedvlieg, Opladen, Germany, assignors to Farbenfabriken Bayer Aktiengesellschaft, Leverkusen, Germany, a corporation of Germany
No Drawing. Filed July 14, 1965, Ser. No. 472,046
Claims priority, application Germany, July 25, 1964, F 43,578
4 Claims. (Cl. 260—465)

ABSTRACT OF THE DISCLOSURE

Compounds of the formula:

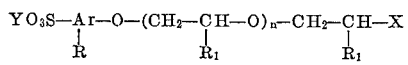

wherein Ar is benzene or naphthalene, R is hydrocarbon, $R_1$ is hydrogen or methyl, X is OH, Cl, CN, O-alkyl, OOC-alkyl or an anionic atom grouping, Y is hydrogen or a salt-forming cation and $n$ is a number from 1 to 8 as well as reaction products of formaldehyde with compounds of the above formula and process of producing the same, said products being useful as dispersing agents, emulsifiers and wetting agents and having high stability in alkaline solutions.

---

The present invention relates to interface-active compounds containing sulpho groups; more particularly it concerns sulpho group-containing compounds of the formula

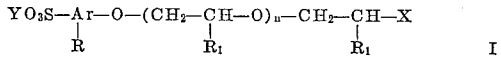   I wherein Ar stands for the radical of benzene or naphthalene, R denotes a hydrocarbon radical, $R_1$ stands for hydrogen or methyl, X stands for OH, Cl, CN, O-alkyl, OOC-alkyl or an anionic atom grouping and Y is hydrogen or the equivalent of a salt-forming cation, while $n$ is a number of 1 to 8, as well as the reaction products of formaldehyde with the compounds of the above formula.

The sulpho group-containing compounds of the present invention are obtainable by various processes. A process of producing compounds which correspond to the above Formula I when X stands for OH consists in the alkoxylation products of the formula

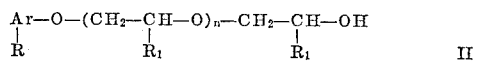   II wherein Ar, R, $R_1$ and $n$ have the meaning stated above are treated with sulphonating agents in a molar ratio of 1 to at least 2, the resultant sulpho group-containing sulphuric acid esters are hydrolysed and the sulpho group-containing products thus obtained of the formula

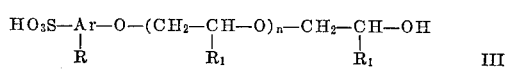   III wherein Ar, R, $R_1$ and $n$ have the meaning stated above, are converted into their salts, if desired after reaction with formaldehyde.

A process of producing compounds which correspond to the above Formula I when X stands for Cl, CN, O—CH₂—CH₂—CN, O-alkyl, OOC-alkyl or an anionic atom grouping consists in that in the alkoxylation products of the general formula

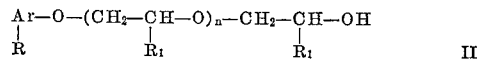   II wherein Ar, R, $R_1$ and $n$ have the meaning stated above, the terminal hydroxyl group is first replaced according to known methods by Cl, CN, O—CH₂—CH₂—CN, O-alkyl, OOC-alkyl or an anionic atom grouping, e.g. by O—SO₃H, O—PO₃H₂ or O—CH₂—COOH, that the reaction products formed are then treated with sulphonating agents, and the resulting sulpho group-containing products of the formula

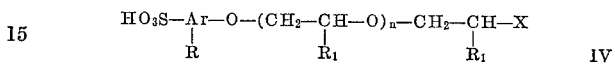   IV wherein Ar, R, $R_1$ and $n$ have the meaning stated above and X stands for Cl, CN, O—CH₂—CH₂—CN, O-alkyl, OOC-alkyl or an anionic atom grouping are then converted into their salts, formaldehyde being allowed to act on the product before or after the sulphonation, if desired.

When Ar and X of Formula IV above are, respectively, a benzene moiety and O—CH₂—CH₂—CN, the resulting sulpho group-containing products and their salts are of the formula:

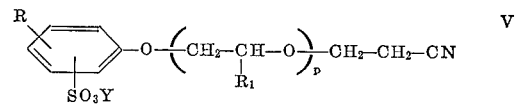   V wherein Y, R and $R_1$ are as aforesaid and $p$ is equal to $n+1$ or 2 to 9.

Suitable alkoxylation products which serve as starting materials for the production of the interface-active compounds of the present invention are for instance the products which are obtained when phenols or naphthols substituted by a hydrocarbon radical, mainly those substituted by a cycloalkyl or aralkyl radical, and especially those substituted by an alkyl radical containing at least 7 carbon atoms, such as octylphenol, isooctylphenol, isononylphenol, isododecylphenol and heptylnaphthol, are reacted with ethylene oxide and/or propylene oxide, particularly in a molar ratio of 1:2 to 9.

Suitable sulphonating agents are, for example, concentrated sulphuric acid and/or chlorosulphonic acid.

The salts, in the present case, comprise the alkali metal and ammonium salts as well as the salts with amines, e.g. with ethanolamine, diethanolamine, triethanolamine and cyclohexylamine.

The compounds obtainable according to the invention can be used in many ways; for example, they are eminently suitable as dispersing agents and emulsifiers, especially as emulsifiers for hydrocarbons in an aqueous medium. The high stability of the compounds to alkaline solutions is noteworthy; they can therefore also be used with good results as wetting agents in an alkaline aqueous medium.

The following examples serve to illustrate the invention without, however, limiting its scope; the parts given are parts by weight.

Example 1.—254 parts of the alkoxylation product prepared from p-isononylphenol and ethylene oxide in a molar ratio of 1:2 are mixed dropwise at 30–40° C. with 95 parts of 93% sulphuric acid. The reaction mixture is stirred at 30–40° C. for 30 minutes and, after the addition of 70 parts 1,2-dichloroethane, mixed dropwise at the same temperature with 104 parts chlorosulphonic acid. After stirring at 30–40° C. for three hours, the 1,2-dichloroethane is distilled off under reduced pressure, and the residue mixed with a solution of 108 parts sodium hydroxide in 250 parts of water. The mixture is then stirred at 80–90° C. for 3 hours; the lower aqueous phase separating during stirring is removed and the water still present in the upper phase is distilled off at 70–80° C. under reduced pressure. The interface-active compound thus obtained corresponds to the formula

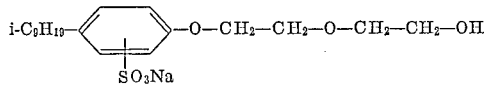

Example 2.—397 parts of the alkoxylation product prepared from p-isononylphenol and ethylene oxide in a molar ratio of 1:4 are mixed dropwise at 70–80° C., after the addition of 3 parts active charcoal, with 180 parts thionyl chloride. The reaction mixture is stirred at the same temperature for 2 hours, the excess thionyl chloride is then distilled off and the active charcoal filtered off with suction. The resultant reaction product is then mixed first with 450 parts chloroform and then dropwise at 10–15° C. with 116 parts chlorosulphonic acid. The reaction mixture is stirred at 30–40° C. for 4 hours; the chloroform is subsequently distilled off at the same temperature under reduced pressure and the residue neutralised with ethanolamine. The interface-active compound thus obtained corresponds to the formula

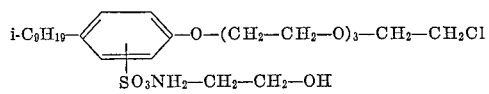

Example 3.—397 parts of the alkoxylation product prepared from p-isononyl phenol and ethylene oxide in a molar ratio of 1:4 are mixed at 40–50° C. with 9 parts of a 45% sodium hydroxide solution and 61 parts acrylonitrile, the mixture is stirred at 50–60° C. for 3 hours and then neutralised with dilute hydrochloric acid. The water and excess acrylonitrile are then distilled off in a vacuum, and 116 g. chlorosulphonic acid are added dropwise at 10–15° C. to the remaining reaction product. The mixture is then stirred at 30–40° C. for 4 hours, kept in a vacuum at 30–40° C. for one hour to remove the hydrogen chloride formed, and subsequently neutralised with a sodium hydroxide solution. The interface-active compound thus obtained corresponds to the formula

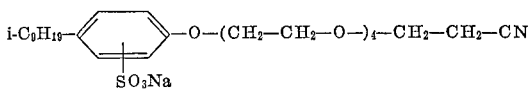

Example 4.—An alkoxylation product prepared from p-isononyl phenol and propylene oxide in a molar ratio of 1:6 is reacted according to the instructions given in Example 3 with acrylonitrile in an alkaline medium, the resultant reaction product is sulphonated with chlorosulphonic acid and the sulphonation product thus obtained is finally neutralised with monoethanolamine. The interface-active compound thus obtained corresponds to the formula

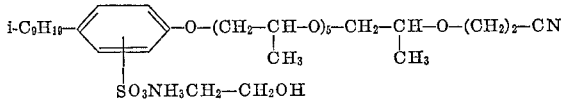

Example 5.—250 parts of the reaction product described in Example 3 and obtained from fourfold ethoxylated p-isononyl phenol and thionyl chloride are added to a solution of 67 parts sodium n-butylate in 350 parts n-butanol; the mixture is stirred at 60–70° C. for 4 hours, the n-butanol is then distilled off under reduced pressure and the precipitated sodium chloride separated. 30 parts chlorosulphonic acid are subsequently added dropwise at 15–20° C. to 114 parts of the remaining oil; the reaction mixture is then stirred at 40–45° C. for 3 hours, then kept in a vacuum at the same temperature for some time to remove the hydrogen chloride formed, and finally neutralised with enthanolamine. The interface-active compound thus obtained corresponds to the formula

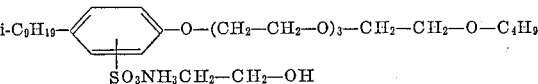

Example 6.—485 parts of the alkoxylation product prepared from p-nonyl phenol and ethylene oxide in a molar ratio of 1:6 are mixed at 60–70° C. with 163 parts acetic anhydride and the mixture is subsequently stirred for 3 hours. The excess acetic anhydride and the acetic acid formed are then distilled off in a vacuum. 220 parts of the acetylation product thus obtained are mixed first with 200 parts 1,2-dichloroethane and then dropwise at 10–15° C. with 49 parts chlorosulphonic acid. The mixture is then stirred at 30–40° C. for 3 hours, the 1,2-dichloroethane distilled off under reduced pressure and the residue neutralised with a concentrated sodium hydroxide solution. The interface-active compound thus obtained corresponds to the formula

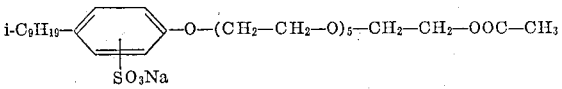

Example 7.—526 parts p-isododecyl-phenoxy hexaethylene glycol are mixed with 9 parts of a concentrated sodium hydroxide solution and then at 50–60° C. with 69 parts acrylonitrile. The reaction mixture is stirred at 50–60° C. for four hours and neutralised with hydrochloric acid. The excess acrylonitrile and the water are subsequently distilled off under reduced pressure. The residue is then mixed dropwise at 10–15° C. with 116 parts chlorosulphonic acid, and the reaction mixture is stirred at 30–40° C. for 4 hours. The reaction product is heated in a vacuum for a short time to remove the hydrogen chloride formed, and subsequently neutralised with diethanolamine. The interface-active compound thus obtained corresponds to the formula

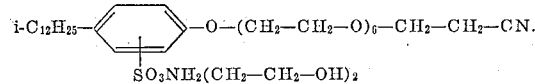

Example 8.—530 parts of the reaction product prepared according to the instructions given in Example 3 from fourfold ethoxylated p-isononylphenol, acrylonitrile and chlorosulphonic acid in the form of the free sulphonic acid, are mixed in the course of 30 minutes at 30–40° C. with 30 g. paraformaldehyde, and the mixture is then stirred at the same temperature for 2 to 3 hours. The resultant highly viscous formaldehyde reaction product is subsequently mixed with 370 parts of water, while stirring, and neutralised with ethanolamine.

Example 9.—308 parts of the alkoxylation product prepared from p-isononyl phenol and ethylene oxide in a molar ratio of 1:2 are mixed first with 4 parts of a 45% potassium hydroxide solution and then dropwise at 40–50° C. with 69 parts acrylonitrile, the mixture is stirred at 50–60° C. for 3 hours and then adjusted with hydrochloric acid to a pH value of 5–6. The water and excess acrylonitrile are subsequently distilled off in a vacuum. To 361 parts of the reaction product thus obtained there are first added 2 parts of concentrated sulphuric acid and then at 30–40° C. in the course of 30 minutes 30 parts paraformaldehyde. The mixture is then stirred at 30–40° C. for 3 hours, diluted with 300 parts carbon tetrachloride and then mixed dropwise at 15–20° C. with 110 parts of 20% oleum. The reaction mixture is stirred at 30–40° C. for 3 hours, the carbon tetrachloride is then distilled off under reduced pressure and the highly viscous residue neutralised with methyl ethanolamine after the addition of 200 parts of water. Finally, the lower phase is separated from the upper phase which forms at 70°–80° C. and contains the formaldehyde reaction product.

Example 10.—397 parts of the alkoxylation product prepared from p-isononyl phenol and ethylene oxide in a molar ratio of 1:4 are reacted, as described in Example 2, first with thionyl chloride and then with chlorosulphonic acid. The reaction product thus obtained is then mixed at 30–40° C. in the course of 30 minutes with 30 parts paraformaldehyde, and the mixture is subsequently stirred at the same temperature for 3 hours, then mixed with 150 parts of water and neutralised with diethanolamine. Finally, the lower phase is separated from the upper phase which forms at 70–80° C. and contains the formaldehyde reaction product.

We claim:

1. A compound of the formula:

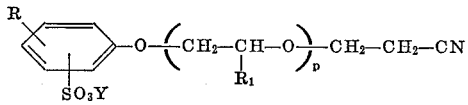

wherein R is alkyl having at least 7 carbon atoms, $R_1$ is hydrogen or methyl, Y is hydrogen, alkali metal, ammonium, ethanolammonium, diethanolammonium, triethanolammonium or cyclohexylammonium and $p$ is a whole number from 2 to 9.

2. The compound of claim 1 wherein R is alkyl having from 7 to 12 carbon atoms.

3. The reaction product formed by reacting one mol of the compound of claim 1 with one mole of paraformaldehyde at a temperature of 30–40° C.

4. The reaction product of claim 3 wherein R of the compound of claim 9 is alkyl having from 7 to 12 carbon atoms.

References Cited

FOREIGN PATENTS 594,477    11/1947    Great Britain.

CHARLES B. PARKER, *Primary Examiner.*

D. H. TORRENCE, *Assistant Examiner.*